A. T. STUART.
ELECTRODE AND ELECTROLYTIC BATTERY.
APPLICATION FILED JULY 1, 1919.
1,406,239.
Patented Feb. 14, 1922.
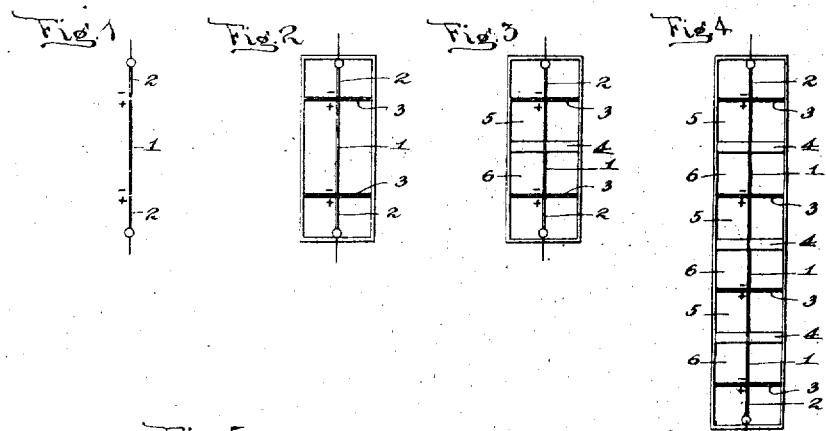
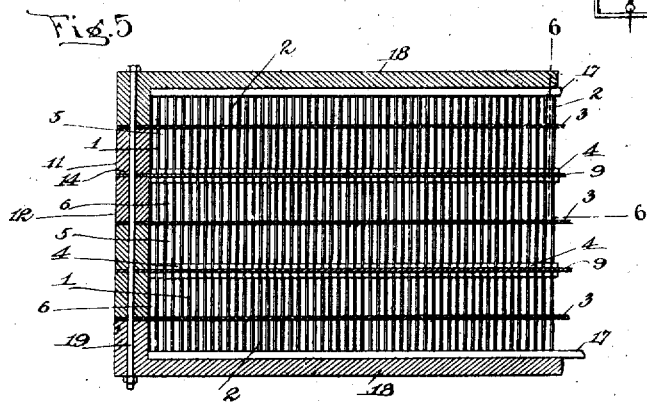
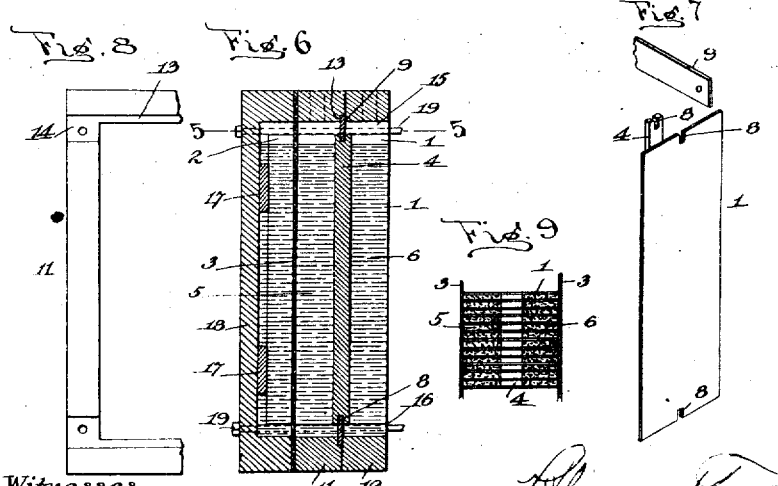

UNITED STATES PATENT OFFICE.

ALEXANDER THOMAS STUART, OF TORONTO, ONTARIO, CANADA, ASSIGNOR TO STUART ELECTROLYTIC CELLS, INCORPORATED, OF WILMINGTON, DELAWARE, A CORPORATION OF DELAWARE.

ELECTRODE AND ELECTROLYTIC BATTERY.

1,406,239.  Specification of Letters Patent.  Patented Feb. 14, 1922.

Application filed July 1, 1919. Serial No. 307,964.

*To all whom it may concern:*

Be it known that I, ALEXANDER THOMAS STUART, a subject of the King of Great Britain, and resident of the city of Toronto, county of York, Province of Ontario, in the Dominion of Canada, have invented certain new and useful Improvements in Electrodes and Electrolytic Batteries, described in the following specification and illustrated in the accompanying drawings, that form part of the same.

The principal objects of this invention are to provide a form of electrode which is particularly adapted for use in an oxygen-hydrogen generator and which will have an extraordinary capacity of gas production while maintaining the maximum electrical efficiency.

Further objects are to devise a bi-polar electrode structure of extremely small dimensions and which may be assembled in exceptionally large numbers to present the maximum active surface with the minimum essential electrolytic gap.

A still further object is to provide a structure which will be exceedingly compact but will allow rapid circulation of the electrolyte and free egress of the gases formed, which will require the minimum of attention, and by means of which the cost of production will be materially reduced.

The principal feature of the invention consists in the novel construction of an electrode in the form of a thin metallic strip arranged in relation to a pair of electric current distributors with its major plane substantially in the direction of the flow of the current, and further in the novel manner of assembling a plurality of such bi-polar strips between diaphragms parallelly arranged and in substantially right angular relation to said strips, division members being arranged to separate the positive from the negative surfaces of the individual parallel electrode strips.

In the accompanying drawings Figure 1 is a diagrammatic view of a single bi-polar electrode.

Figure 2 is a diagrammatic view of a bi-polar electrode arrangement for a storage cell.

Figure 3 is a diagrammatic view of the arrangement of the bi-polar electrode for an oxygen-hydrogen generator.

Figure 4 is a diagrammatic view of a plurality of individual bi-polar strip electrodes arranged in series.

Figure 5 is a horizontal sectional view of an oxygen-hydrogen generator illustrating the preferred method of assembling the bi-polar electrodes in series parallel the section being taken on the line 5—5 of Figure 6.

Figure 6 is a detail vertical sectional view on the line 6—6 of Figure 5 of a portion of the device shown in Figure 5.

Fig. 7, is a detail perspective view showing an electrode strip, a division member and a portion of a partition bar.

Fig. 8 is a face view of a frame member, and

Fig. 9 is a side elevation of a modification.

It has been previously proposed to form electrodes for oxyhydrogen generators by the use of a plurality of thin metal strips in which the strips have been individually connected to electric conductors and which strips are uni-polar.

The form of electrode forming the neucleus of this invention is a thin metallic strip which presents the greatest active surface for the mass of metal. The strip 1 is formed long and narrow of thin plate, or even foil or fine wire gauze, and is placed between electric current distributors 2 with its longitudinal edges as close to the distributors as possible, as illustrated in Figure 1, thus placing the major plane of the strip in the direction of flow of the current.

If the electrode is to be used for storage battery purposes it will be placed between diaphragms 3 arranged between the longitudinal edges of the strip, and the distributors 2, and between each pair of electrodes when more than one are employed.

When used for electrolysis of water the strip is placed as illustrated in Figure 3 and division members 4 are arranged longitudinally of the strips, for the entire length thereof, thereby forming gas chambers 5 and 6 between the diaphragms 3 and the members 4. The gas chambers will be divided into small cells by those portions of the strips 1 extending from the members 4 to the diaphragms 3.

The bi-polar strips may be arranged in series of an indefinite length, each strip 1 being separated from the adjacent strip by the least possible electrolytic gap, the diaphragms 3 filling the gaps between the strips.

A practical application of the invention is illustrated in Figures 5 and 6 which are diagrammatic, in that the spaces between the various strips are greatly exaggerated. The bi-polar strips are assembled together to form a composite element and the preferable construction is to cut strips of thin sheet metal, foil or gauze about ¾ inch wide and 24 inches long. These strips are arranged in parallel relation and spaced apart about 1/32 of an inch by the members 4. The spacing members 4 are preferably narrow strips about 1/16 of an inch wide and a sufficient number are placed together between each of the strips 1 to separate the strips 1 the required distance. The separating members 4 are of the same length as the strips 1, and may be of any desirable material and, as the strips 1 are arranged in parallel and are not required to be insulated one from the other, the members 4 may be of any material which will not be acted on by the electrolyte and which will form gas-tight joints between the strips. When the required number are assembled, say to a width of about 24 inches, the whole is placed under pressure and clamped together. The structure thus produced comprises a plurality of thin strips each of which is of considerable length as compared with its width. The strips are separated from each other by the members 4 which extend the entire length of the strips. The strips are therefore arranged with their major surfaces opposed, and when current is supplied to one edge of each or any strip, it, the current, will travel toward the opposite edge, in the direction of the major plane of the strip or strips. The end edges of the composite member thus constructed are then formed with slots 8 into which are inserted metal bars 9.

In assembling the composite members just above described, a pair of open rectangular frames 11 and 12 is provided for each member. On opposite sides of the frame element 11 are recesses 13, 13. The recesses are of slight depth across the opening in the frame but on the walls which ultimately become the side walls of the casing the recess extends through the wall as shown in Fig. 8.

The composite member is laid in the frame 11 with the bars engaging the recesses as shown in Fig. 6. The projecting ends of the bars lie in the portions 14, 14 of the recess and extend through the side wall of the frame. The frame 12 is now positioned over the frame 11, the joint between the frames being filled with paint, cement, or the like to prevent leakage at the joint. The free edges of the strips 1 are in the same planes as the free edges of the built up frame member 11—12.

The strips 1 and members 4, do not extend entirely across the frame from top to bottom, there being a space 15 above the composite member and a space 16 below the same. The bars 9 divide these spaces, whereby the frame 11—12 is divided to form two chambers 5 and 6, one on each side of the transverse center thereof, and each of said chambers is divided by means of the strips 1 into a large number of vertical channels extending between the spaces 15 and 16. As many of the frames 11—12, as desired are placed together face-to-face with a diaphragm 3 between each frame member.

It is necessary to provide proper current distributors for each battery of cells, and at each end of the battery is arranged a set of thin metal current distributors 2, corresponding in number and spacing with the bi-polar strips of the composite members. These are rigidly secured together and in electrical contact with suitable bus bars 17 and the bus bars are suitably connected to an electric current supply. The bus bars 17, and current distributors 2, are carried in end frame members 18 each composed of a shallow box open at one side. The free edges of the distributors are on the same plane as the edges of the members 18. The members 18 are assembled, one at each end of the range of frame members 11—12, and a diaphragm 3 is positioned between the end members and the adjoining frame member. Bolts 19 are now passed through the walls of all of the frame members, the diaphragms and the bars 9 thereby securely fastening the frame members together with the current distributors and electrodes in position.

Current is fed to the end distributors and flows therefrom to the adjacent strips 1 through the diaphragms which are preferably composed of asbestos fabric. The strips are rendered bi-polar, in that the current enters at one edge, being the negative edge, and travelling the width of the strip leaves at the opposite and positive edge. This transmission of current continues throughout the entire length of the battery of cells, which may contain any desirable number of bi-polar units.

Hydrogen is generated on the negative portion of each individual electrode strip, and oxygen is generated on each positive portion. These portions are separated by dividing members 4 and bars 9, and the gases formed are conducted from their respective chambers in any suitable manner.

The individual electrode strips in the composite units are uniformly positioned, consequently the strips of each successive unit are in alignment, and there will be an approximately uniform current flow to each separate and individual electrode strip, and as the strips are of similar potential and all are in parallel it is immaterial whether or not the individual strips in each composite unit are in metallic contact.

Each electrode strip may be exceedingly thin and on account of the parallel arrangement, the current will be uniformly distributed through a great number of strips. To illustrate, if there are approximately 700 strips in each unit and these are 24 inches long and ¾ of an inch wide, and a current flow of 700 amperes is carried, each strip will carry but one ampere through a strip length of 24 inches, consequently there will be but $\frac{1}{24}$ of an ampere across its width of ¾ of an inch.

It will also be understood that an enormous surface of metal is exposed to the electrolytic action and polarization is practically eliminated.

Another extremely important feature of this invention is that the units are remarkably easy to handle by reason of their independent arrangement and they do not require to be electrically connected the one with the other by any mechanical means.

When the parts are assembled as shown in Figs. 5 and 6, the casing is filled with water suitably treated to form an electrolyte. The level of the electrolyte may be at any point below the top edges of the strips 1. The electrolyte may pass through the diaphragm 3, but cannot pass the partition members 4 and 9.

When current is supplied to one current distributor it will pass through the porous diaphragms in the electrolyte, and through the partitions formed of the members 4 by the metallic path formed by the strips 1.

The edges of the first strips to receive the current will be of negative polarity and hydrogen gas will be generated on those portions of the strips. The gas cannot pass either the diaphragm 3 or the partition 4 and consequently it will rise in the spaces between the strips at the side of the partition into the spaces above the same, and be withdrawn therefrom in any desired manner.

The current leaving the opposite edges of the strips will render those edges positive, and oxygen will be generated on these portions of the strips at that side of the partition, and will be withdrawn as before. This will continue throughout the battery.

The gas generated will be kept in separate chambers as it cannot pass through the diaphragms, and obviously it cannot pass through the partitions 9 and 4, nor can it pass through the strips. The current will follow the metallic path formed by the strips and partition members, and pass in the electrolyte through the diaphragms which are pervious to the fluid.

The form of electrode shown and described is particularly adaptable for oxy-hydrogen gas production, but it must be understood that the same structure of bi-polar units may be utilized very effectively in connection with other forms of electrolytic cells, and in storage battery work.

For storage battery construction the spaces between the individual bi-polar electrode strips may be filled with active material of one kind upon one side of the dividing members and of another kind on the other side and they may be set horizontally to sustain the active material in position.

What I claim as my invention is:—

1. A bi-polar electrode comprising a metallic strip having its major plane arranged in the direction of the flow of an electric current through the electrode.

2. A bi-polar electrode comprising a metallic strip of uniform cross section having its major plane arranged in the direction of the flow of an electric current through the electrode.

3. A bi-polar electrode comprising a pair of opposed electric current distributors, there being a gap between the distributors, and a metallic strip within the gap, said strip having its major plane arranged in the direction of the flow of an electric current between the distributors.

4. A bi-polar electrode comprising a pair of opposed electric current distributors, there being a gap between the distributors, a metallic strip within the gap, said strip having its major plane arranged in the direction of the flow of an electric current between the distributors, and gas tight diaphragms arranged between opposite edges of the metallic strip and the current distributors.

5. A bi-polar electric cell comprising a pair of opposed electric current distributors, there being a gap between the distributors, means whereby an electric current may be passed across the gap, a metallic strip within the gap, said strip having its major plane arranged in the direction of the flow of the electric current between the distributors, means for separating the positive from the negative surface of said metallic strip, and diaphragms arranged between the edges of the metallic strip and the current distributors.

6. A bi-polar electrolytic battery comprising a pair of opposed electric current distributors, there being a gap between the distributors, means for passing an electric current across the gap, a plurality of metallic strips arranged in series within the gap and with their major planes arranged in the direction of the flow of the current between the distributors, said strips being separated the one from the other by the minimum electrolytic gap.

7. A bi-polar electrode comprising a pair of opposed electric current distributors, there being a gap between the distributors, means for passing an electric current across the gap, a plurality of spaced metallic strips arranged in parallel within the gap, means between the strips for separating the positive from the negative surface of each strip, and diaphragms arranged between the edges of said strips and the current distributors.

8. An electrolytic battery, comprising an electrode consisting of a plurality of spaced elements arranged in parallel, a pair of opposed electric current distributors each including a plurality of spaced elements arranged in parallel, there being a gap between the distributors, each element of the electrode having its major plane arranged substantially in the direction of the flow of the current, said electrode being arranged in series within the gap between the distributors said electrode being separated from the distributors by the minimum electrolytic gaps.

9. An electrolytic battery, comprising an electric current distributor at each end thereof, a plurality of bi-polar electrodes each formed of thin metallic strips arranged in parallel, means whereby an electric current may be passed through the electrodes and distributors, partitions between said strips spacing them apart and separating said strips into positive and negative surfaces, said electrodes being arranged in series, and diaphragms of porous di-electric material between each of said electrodes and between the electric current distributors and the adjacent electrode.

10. An electrode, comprising a plurality of long, narrow, thin metallic strips arranged with their major surfaces parallel, separating members of lesser width arranged between the aforesaid strips midway of their width and extending the length thereof, said strips and members having notches in their opposing ends, and holding bars secured in said notches, and means for securing said holding bars in place.

11. An electrolytic cell, comprising a casing, a current distributor at opposite ends of the casing, there being a gap between the distributors, said gap being of considerable length, an electrode disposed within the gap and separated from each distributor by a narrow electrolytic gap, a porous diaphragm in each electrolytic gap and filling the same, a partition on each side of the electrode, said partition being substantially parallel with the diaphragms and disposed between the same whereby the said casing is divided into a plurality of chambers on each side of the electrode.

12. An electrolytic battery, comprising a rectangular casing, a current distributor at each end of the casing and within the same, said distributors comprising a plurality of thin, narrow strips spaced apart and vertically arranged with the thin edges of one distributor directed toward those of the other distributor and in substantial alignment therewith, a plurality of electrodes within the casing and disposed between the distributors, the said electrodes being in series with each other and with the distributors, each electrode comprising a plurality of thin, narrow strips spaced apart and vertically arranged in the same manner as are the distributor strips, there being a short electrolytic gap between the electrodes and between the end electrodes of the series and the distributors, the strips of each electrode being arranged side by side with the thin edges opposed to the thin edges of the distributors, there being partitions between the strips of each electrode, said partitions extending vertically the entire length of the strips, a porous diaphragm in each electrolytic gap, whereby a plurality of gas tight chambers are formed, each chamber being bounded by adjacent strips, a partition and the diaphragm, and an electrolyte filling the chambers whereby when an electric current is caused to traverse the battery from one distributor to the other, the electrolyte will be decomposed and hydrogen will be generated in the chambers at one side of the partitions, and oxygen will be generated in the chambers on the opposite sides of the partitions.

ALEXANDER THOMAS STUART.